US012060137B2

(12) United States Patent
Drachmann et al.

(10) Patent No.: US 12,060,137 B2
(45) Date of Patent: Aug. 13, 2024

(54) LIFTING DEVICE AND METHODS OF OPERATING A LIFTING DEVICE

(71) Applicant: MacArtney A/S, Esbjerg V (DK)

(72) Inventors: Mads Drachmann, Esbjerg V (DK); Lasse Møller Rasmussen, Kolding (DK)

(73) Assignee: MacArtney A/S, Esbjerg V (DK)

( * ) Notice: Subject to any disclaimer, the term of this patent is extended or adjusted under 35 U.S.C. 154(b) by 23 days.

(21) Appl. No.: 17/623,571

(22) PCT Filed: Jun. 30, 2020

(86) PCT No.: PCT/EP2020/068352
§ 371 (c)(1),
(2) Date: Dec. 28, 2021

(87) PCT Pub. No.: WO2021/001347
PCT Pub. Date: Jan. 7, 2021

(65) Prior Publication Data
US 2022/0250719 A1 Aug. 11, 2022

(30) Foreign Application Priority Data
Jul. 2, 2019 (EP) .................................... 19183932

(51) Int. Cl.
*B63B 27/10* (2006.01)
*B66C 13/06* (2006.01)
*B66C 23/14* (2006.01)
*B66C 23/52* (2006.01)

(52) U.S. Cl.
CPC ............ *B63B 27/10* (2013.01); *B66C 13/063* (2013.01); *B66C 23/14* (2013.01); *B66C 23/52* (2013.01)

(58) Field of Classification Search
CPC ......... B63B 27/10; B63B 27/16; B63B 27/36; B63B 2027/165; B66C 13/063; B66C 13/02; B66C 13/04; B66C 13/06; B66C 13/12; B66C 13/18; B66C 13/22; B66C 13/46; B66C 23/14; B66C 23/52; B66C 23/06; B66C 23/20; B66C 23/10;
(Continued)

(56) References Cited

U.S. PATENT DOCUMENTS 2,780,196 A 2/1957 Jareckie et al.
3,671,986 A * 6/1972 Peters .................... B63B 23/10 114/373
(Continued)

FOREIGN PATENT DOCUMENTS

CN 106132820 11/2016
CN 108137291 6/2018
(Continued)

*Primary Examiner* — Michael R Mansen
*Assistant Examiner* — Henrix Soto
(74) *Attorney, Agent, or Firm* — McHale & Slavin, P.A.

(57) ABSTRACT

A lifting element, such as for a vessel or vehicle, comprising a lifting element, such as an oblong element, rotated by a number of electrical motors via a rotatable, such as an eccentric, element. The eccentric element ensures that the lifting element can only be tilted within a predetermined angle area increasing the safety thereof. Multiple electric motors are used where one motor counteracts the other within an angle interval to ensure that the tilting element does not tilt undesirably.

6 Claims, 1 Drawing Sheet

Figure 2:
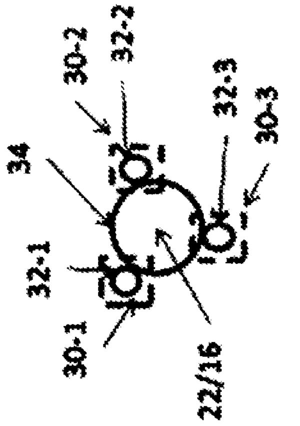

(58) Field of Classification Search
CPC ..... B66C 23/62; B66C 23/08; B66C 2700/03; B66C 2700/0307
USPC .......................................................... 212/273
See application file for complete search history.

(56) References Cited

U.S. PATENT DOCUMENTS

| | | | | | |
|---|---|---|---|---|---|
| 4,268,214 | A * | 5/1981 | Zeldman | E02F 3/38 414/710 |
| 4,293,265 | A | 10/1981 | Lueck et al. | |
| 4,572,383 | A * | 2/1986 | Mori | B66C 23/205 212/257 |
| 9,290,241 | B2 * | 3/2016 | Kweldam | E02F 3/8841 |
| 2008/0217279 | A1 | 9/2008 | Gelies et al. | |

FOREIGN PATENT DOCUMENTS

| | | | | |
|---|---|---|---|---|
| DE | 3721625 | | 1/1989 | |
| EP | 0039529 | A2 * | 11/1981 | |
| EP | 3318530 | | 5/2018 | |
| GB | 2353267 | A * | 2/2001 | A61G 3/062 |
| JP | 2014189371 | | 10/2014 | |
| WO | WO-0023319 | A1 * | 4/2000 | B63B 27/36 |
| WO | WO-2018203756 | A1 * | 11/2018 | A63H 17/12 |
| WO | WO-2019125263 | A1 * | 6/2019 | B60P 1/483 |

* cited by examiner

LIFTING DEVICE AND METHODS OF OPERATING A LIFTING DEVICE

CROSS REFERENCE TO RELATED APPLICATIONS

This is a national stage filing in accordance with 35 U.S.C. § 371 of PCT/EP2020/068352, filed Jun. 30, 2020, which claims the benefit of the priority of European Patent Application No. 19183932.3, filed Jul. 2, 2019, the contents of each are incorporated herein by reference.

The present invention relates to a lifting device and methods of operating a lifting device, such as a lifting device for a vessel.

A number of problems exist in lifting devices for vessels, such as the potential leaking of hydraulics leak fluids/oil from the drives thereof. Lifting devices and the like may be seen in U.S. Pat. Nos. 4,293,265, 2,780,196, JP2014189371 and US2008/217279.

It is an object of the invention to prevent such leakage.

It is another object of the invention to ensure the safety around such lifting devices.

In a first aspect, the present invention relates to a lifting device for a vessel or vehicle, the device comprising:

- a lifting element tiltable around a predetermined first axis,
- a drive arrangement for tilting the lifting element, the drive arrangement comprising:
  - a drive rod connected to the lifting element,
  - a rotatable element rotated by one or more electrical motors around a second axis, the drive rod being connected to the rotatable element so as to rotate around a third axis not identical to the second axis, the rotatable element being rotatable around the second axis between a first position where the distance between the second axis and the fourth axis is a minimum distance and a second position where the distance between the second axis and the fourth axis is a maximum distance, the motor(s) being configured to rotate more than 360° to bring the rotatable element from the first position to the second position.

In the present context, a lifting device may be any type of structure capable of supporting the weight of a load to be lifted and/or transported. Typical lifting devices are cranes, booms, masts and the like. A preferred lifting device type is a so-called Launch And Recovery System (LARS) for vessels.

In the present context, a vessel may be any type of ship, platform, boat or the like. The vessel may be capable of sailing or may be stationary, such as on an ocean or sea floor. The vessel may be configured for launching and/or recovering loads to/from one side of a railing or outer periphery of the vessel to a position inside the railing/periphery, such as on the deck.

In addition, a vehicle may be any type of vehicle, such as a truck/lorry. The vehicle may be configured to also transport a load, such as on a flat bed or in a container, or the vehicle may be configured only for lifting or shifting loads.

The lifting element preferably is rigid. In this context, rigid means that the lifting element does not bend or deform to any significant degree under normal use, such as when lifting loads with a weight below a set threshold.

The lifting element is tiltable around the first axis. Tiltable in this respect may be a rotation, such as via a bearing, around the axis. The tilting preferably is a tilting of a main direction of the lifting element or a direction from the first axis and an opposite end of the lifting element, such as a wire/chain block thereof. Then, the lifting element may have a more complex shape or structure with multiple interconnected and movable parts. Naturally, the lifting element may be a simple rod or fixed frame structure such as an A frame.

The lifting element may be configured to support the weight of the load. The lifting element may comprise means, such as blocks, wheels, rollers or the like, for allowing a cable, chain or wire to extend therefrom to the load as well as to e.g. a winch for performing a lifting. Alternatively, the lifting element may comprise a more stationary structure for engaging the load, such as a chain fixed to the lifting element.

The first axis may be horizontal or at least substantially horizontal. In addition or alternatively, the first axis may be parallel to a main surface or deck of the vessel or vehicle if desired.

The drive arrangement comprises any number of electric motors of any type. Usual drivers for driving such lifting elements on board vessels and vehicles are hydraulic. Electric motors have a much lower risk leaking oil or other fluids, and electric motors are easily set-up in a structure with redundancy especially in a rotating set-up (see further below). Also, spare parts are more readily available worldwide, the energy consumption is lower, the maintenance cost is lower, and the controlling is future proof.

The drive arrangement is capable of tilting the lifting element when the rotatable element is rotated.

The drive rod preferably is rigid, even though the function thereof may be obtained using even wires. A rigid rod will be able to withstand both pulling and pushing caused by the rotation of the rotatable element.

The rotatable element is rotated by one or more electrical motors around a second axis, the drive rod being connected to the rotatable element so as to rotate around a third axis not identical to the second axis, and the rotatable element is rotatable around the second axis between a first position where the distance between the second axis and the fourth axis is a minimum distance and a second position where the distance between the second axis and the fourth axis is a maximum distance. Thus, the rotatable element defines extreme positions between which it may move. This then defines extreme angles or positions of the lifting element. When rotating the rotatable element between its extreme positions, the motor(s), i.e. the rotatable portion vis-à-vis a housing thereof, rotate more than 360°, so that these will not provide a safety stop, if the motors are rendered inoperable or not controllable/breakable, but this is not a safety issue as the rotatable element defines the extreme positions.

The rotatable element may be able to rotate 360 degrees or only within a predetermined angle interval. The rotatable element is rotatable around a second axis which is not identical to the third axis around which the drive rod may be rotated in relation to the rotatable element.

The rotatable element may be an eccentric element in the sense that rotating it around the second axis will move the third axis around the second axis. This has the effect that when a fixed distance is seen between the third axis and a particular portion of the lifting element (not identical to the first axis), rotation of the rotatable element will cause the lifting element to tilt or rotate.

Preferably, the first, second and third axes are at least substantially parallel. In this manner, the tilting of the lifting element takes place in the same plane as the rotation of the rotatable element. Clearly, however, structures exist where e.g. the drive rod or another element is capable of transferring force and/or torque from the rotational element and into another direction or plane in which the lifting element may tilt.

Preferably, the drive rod is connected rotatably to the lifting element around a fourth axis not identical to any of the other axes. Preferably, this axis is parallel to the first axis.

The drive rod may be connected to the lifting element at a predetermined distance from the first axis.

Clearly, when the second, third and fourth axes are aligned and the second axis as far from the fourth axis as possible, rotation of the rotatable element cannot bring the lifting element farther to one side. In the same manner, when the second axis is as close as possible to the fourth axis, when the second, third and fourth axes are aligned, rotation of the rotatable element cannot bring the lifting element farther to the other side. Thus, the lifting element cannot move outside of this angle interval. Thus, a safety feature may be provided where the lifting element can only move within an angle interval defined by the distances between the second and third axes and the first and fourth axes.

A second aspect of the invention relates to a method of operating the lifting device according to the first aspect, wherein the motor(s) rotate(s) the rotatable element driving the drive rod, the drive rod rotating the lifting element around the first axis.

Then, during a 360 degree rotation or a rotation from one extreme to the other extreme of a rotation interval of the rotatable element around the second axis, the distance between the second axis and the fourth axis may vary between a minimum distance and a maximum distance. In that situation, the lifting element may tilt between a minimum angle and a maximum angle, bringing about a safety feature of lifting elements.

If a full rotation is not possible or desired, the same safety may be obtained when, at a first rotational angle of the rotatable element, the lifting element is at a first extreme angle and, at a second rotational angle of the rotatable element, the lifting element is in a second, opposite, extreme angle and, for rotational angles between the first and second rotational angles of the rotatable element, the lifting element is at an angle between the first and second extreme angles.

Thus, the rotatable element is preferably rotatable around the second axis between a first position where the distance between the second axis and the fourth axis is a minimum distance and a second position where the distance between the second axis and the fourth axis is a maximum distance. Then when the motor(s) rotate more than 360° to bring the rotatable element from the first position to the second position, the motors may not represent a physical blocking or braking of the rotation. The extreme positions of the rotation thus are defined by the first and second positions.

A third aspect of the invention relates to a method of operating a lifting device, the device comprising a rigid lifting element tiltable around a predetermined first axis and a plurality of motors for tilting the lifting element, the method comprising

- determining a parameter of the lifting device and controlling the motors so that:
- if the parameter is within a predetermined interval, operating at least one motor to provide a torque to the lifting element in a direction opposite to a direction in which torque is applied by one or more of the other motors,
- if the parameter is outside of the interval, operating all motors to provide torque to the lifting element in the same direction.

Naturally, all aspects, embodiments and situations may be combined if designed. The manner of tilting the lifting element may clearly be advantageous if the second and third aspects are combined, for example.

In the present context, the lifting device may have the structure described in relation to the first aspect. Alternatively, the motors may tilt the lifting element in other manners, such as by or via other means. In one situation, the motors may rotate or tilt the lifting element directly at or around the first axis.

The lifting element may be rotatable around the first axis described above.

The plurality of motors may be of the same or different types. Different types of motors exist for performing a rotation, such as linear drives, hydraulic drives, electro motors (stepper motors for example) and the like. Preferably, the motors are electrical motors.

Two or more motors may be used, such as 3, 4, 5, 6, 7, 8 or more motors. The motors preferably are of the same type, but this is not a requirement.

The motors may engage the lifting element directly or via one or more other elements. In one embodiment, the motors engage the lifting element via a drive rod and a rotatable element as described above. A parameter is determined for the lifting element, and the motors are operated accordingly. One such parameter may be an angle between vertical and a longitudinal axis of the lifting element. Another parameter may be a torque with which the motors affect the lifting element. The parameter may be a parameter determined from the lifting element or from e.g. the motors. The parameter may be determined by one or more sensors or in any other manner. As mentioned, the torque exerted by a motor may be read-out from the motor without requiring a separate sensor.

Common to the parameters may be that they represent a risk or probability that the lifting element passes a point where the force required to maintain its position or angle shifts from one direction around the first axis to an opposite direction. If the lifting element is straight, is supported by a stable platform and only has a load hanging vertically therefrom, the torque required to rotate the lifting element will depend on the angle between a longitudinal axis of the lifting element and vertical. When this angle is small, only a small torque is required, whereas a larger torque is required for larger angles.

On the other hand, if the lifting element is more curved, if it is not supported on a stable platform, such as on a floating platform, or if additional torques are applied thereto, such as from a winch to a block on the lifting element, the torque required to even move the lifting element over a vertical direction may be substantial. Then, however, another angle will exist where the torque is smaller than at adjacent angles.

The problem at the low torque angles is that when the motors all operate in the same direction, imperfections in the drive may allow the lifting element to move over this point even when the motors are stationary. Also, there is a risk that a motor exerting a torque in one direction will not effectively prevent further movement in that direction. This may create a shifting or swinging of a load which is not desired.

The motors are controlled in a rather unusual manner. If the parameter is within a predetermined interval, such as below a threshold value, at least one motor is operated to provide a torque to the lifting element in a direction opposite to a direction in which torque is applied by one or more of the other motors. Thus, if the "other" motors exert a torque in the clockwise direction the "at least one" motor will exert a torque in the counter-clockwise direction.

The motors now work in opposite directions. Then, at least the torque applied by the "at least one" motor must be overcome to rotate the lifting element further in the direction of the torque by the "other" motors.

When the parameter is outside of the Interval, such as above the threshold value, all motors are operated to provide torque to the lifting element in the same direction.

Naturally, a motor (or more motors) may be provided which does not provide torque when the parameter is outside of the interval but only operates as the "at least one" motor when the parameter is within the interval.

A motor may be disengaged so as to not provide any significant torque or resistance. This may also be used for back-up motors which are to be used only if a main, operating motor fails. Disengagement may be detachment of the motor from the tilting of the lifting element. Alternatively disengagement may simply be not feeding the motor with power.

A fourth aspect of the invention relates to a lifting device comprising a lifting element, a plurality of motors configured to tilt the lifting element as well as a controller for controlling the motors according to the third aspect.

Naturally, the lifting element and lifting device may be as described above. The motors preferably are electrical motors, but this is not a requirement.

The controller may be any type of controller, such as a processor, controller, ASIC, DSP, FPGA or the like. The controller may be monolithic or divided into different parts. The controller may comprise one or more drivers for feeding the motor(s) with electricity, hydraulic pressure, controlling signals, sensing signals or the like.

In one embodiment, as mentioned, the motors are electrical motors.

In one embodiment, the motors exert the oppositely directed torques whenever the lifting element Is rotated.

In another embodiment, the lifting device further comprises a sensor for outputting information relating to an angle between a longitudinal direction of the lifting element and vertical, the controller being configured to receive the information. This sensor may also be attached to e.g. a toothed wheel of the drive. Naturally, also the rotational position of the motor(s) will indicate the angle of the lifting element.

In that or another situation, the controller is configured to receive a signal representing a torque applied by the motors on the lifting element.

In this situation, the direction of the torque may be taken into account, as the "at least one" motor exerts a torque counter-acting that of the other motors. Thus, the resulting torque applied to the lifting element may be the difference between the torque exerted in one direction and that exerted in the opposite direction.

Yet another aspect of the invention is the controlling of a lifting device for launching or recovering a load from/to a vessel, which method may use any of the above lifting devices, and which method comprises determining a movement and/or a position of the load when hanging from or supported by the lifting element and moving the lifting element so that any relative movement between the lifting element, such as a part thereof supporting the load or from which the load hangs, and the load is below a predetermined threshold.

A problem encountered on vessels is that loads to be launched or recovered may swing due to the vessel rotating and tilting. A swinging load is dangerous. A load swinging in a plane in which the lifting element is capable of moving/rotating makes it possible to rotate the lifting element and thus minimize or even reduce relative movement between the lifting element and load. Thus, the load may now hang more or less stably below the lifting element which may now be rotated to its desired position without causing the load to swing excessively.

Clearly, a swinging load is the easiest to "catch" when at an extreme position, as the load will be more or less immobile at that position. Thus, moving the lifting element or lifting point to above this position when the load is in that position, the relative positions of the lifting element and load no longer induces the swinging motion. Naturally, the load may also have its swinging motion braked by moving the lifting element counter to the swinging motion in order to break the movement. A combination of the two strategies may be used where firstly a breaking breaks the load movement, where after the lifting element may be positioned at a stationary position of the load.

This may require a rather swift movement of the lifting element. Swift movements are the easiest when not too much torque is required. Thus, the braking movement may be performed when the lifting element is at or close to the above and below top point where it requires the least torque to rotate it. Rotation around this top point may be made swifter and thus is optimum for braking or decelerating a load.

Figure 3:
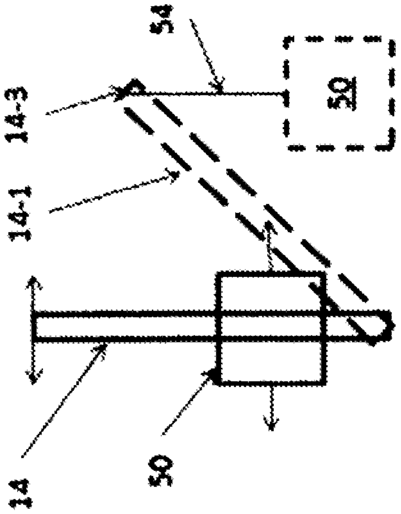
Figure 1:
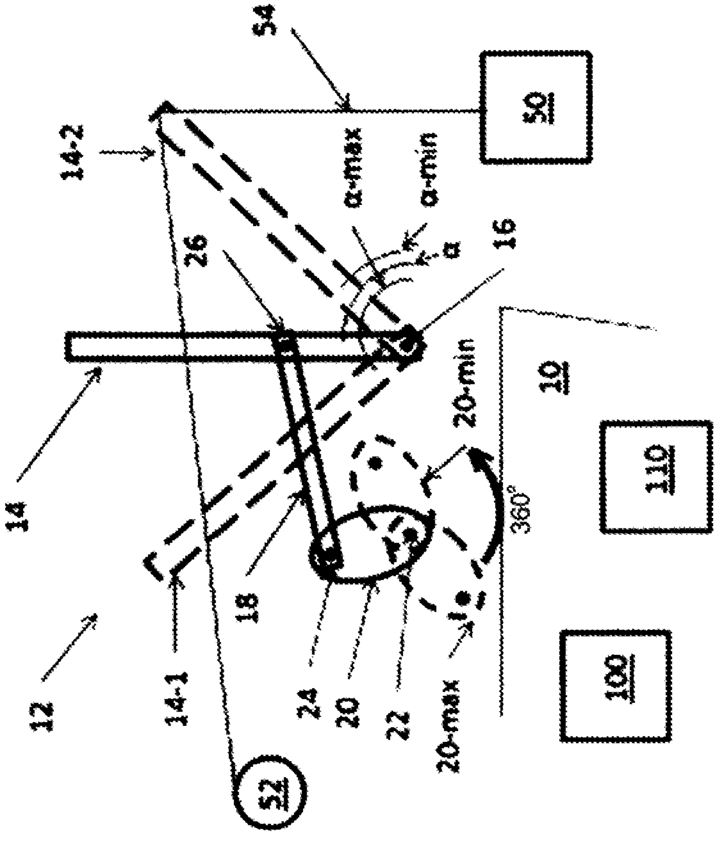

In the following, preferred embodiments are described with reference to the drawings, wherein:

FIG. 1 illustrates a first embodiment of a lifting device for a vessel,

FIG. 2 illustrates an embodiment where multiple motors drive a lifting element, FIG. 3 illustrates a parameter of a lifting element, In FIG. 1, a vessel 10 comprises a lifting device 12 comprising a crane, boom, rod or lifting element 14 rotatable around an axis 16. In many applications, the boom 14 actually is an A frame, such as a Launch And Recovery System (LARS) having two uprights rotatable around the same axis 16 and usually both driven by a separate hydraulic drives.

In the present embodiment, the lifting element 14 is driven by a drive rod 18 driven by a motor (not illustrated) via an eccentric or rotatable element 20. The motor drives the eccentric element 20 around an axis 22, and the eccentric element 20 is rotatably connected to the drive rod 18 around an axis 24.

The drive rod 18 is rotatably connected to the lifting element at an axis 26.

In operation, the eccentric element 20 is rotated around the axis 22. Clearly, the drive rod 18, due to this movement, will pull or push the lifting element, so that the lifting element 14 rotates around the axis 16.

The lifting element 14 may then be rotated to e.g. be able to receive instruments or the like 50 from outside of the vessel and to on board the vessel—or vice versa. Naturally, a wire, chain or the like 54 may be anchored or supported by the upper end of the lifting element for that purpose.

The operation of the eccentric element 20 is, apart from transferring movement and torque to the drive rod 18, to ensure that the lifting element 14 cannot move outside of an angle interval defined by a first, maximum angle α-max and a second, minimum angle α-min. These angles may be defined relative to e.g. horizontal. The maximum angle is seen when the axes 22, 24 and 26 are aligned (eccentric element 20 indicated at 20-max and the lifting element at 14-1) and the axis 22 is as close as possible to the axis 26 as possible. The minimum angle is seen (eccentric element 20 indicated as 20-min and lifting element at 14-2) when the axes 22, 24 and 26 are aligned and the axis 22 is as far away as possible from the axis 26.

Thus, even if the drive of the eccentric element 20 breaks down, the lifting element 14 cannot move outside of the above angle interval, which makes the lifting device safe.

A controller 110 controls the operation of the lifting device 12.

In FIG. 2, a drive is illustrated using multiple motors 30-1, 30-2 and 30-3, each having a toothed wheel 32-1, 32-2, and 32-3, respectively, engaging a central toothed wheel 34, which may be connected to the lifting element 14, such as at the axis 16, or to the eccentric element 20, such as at the axis 22.

The use of multiple motors naturally may be preferred in order to achieve a sufficient torque and/or for providing redundancy so that if one motor becomes inoperable, the other motors may still provide the desired drive.

However, another advantage may be obtained if the motors are driven according to an embodiment of the invention.

In this embodiment, the torque required to rotate the lifting element 14 will depend on the angle to vertical as sensed by sensor 100. Naturally, the torque required to rotate the lifting element 14 will also depend on e.g. a pulling force exerted to a load via the lifting element 14 if the winch is not provided on the lifting element 14. Thus, an angle will exist where the rotation of the lifting element 14 will require zero torque. This could be called the "top point" even though this point may not be a vertical position. When the lifting element 14 is in the top point, however, manufacturing imperfections in the device 12 may allow the lifting element 14 to rotate slightly around the axis 16, even when the motors are stationary, where wind, waves or the swinging of the load exerts even a small force on the lifting element 14 bringing it over the top point. This is not desired and in particular not when a heavy load 50 is hanging from the lifting element 14.

A solution to this is to have one motor, 30-1, provide a torque in the opposite direction, at least when the lifting element 14 is sufficiently close to vertical (top point). In that situation, the lifting element 14 is not allowed to rotate around the axis 16 unless allowed to do so by the motors. Clearly, the motor 30-1 will, in order for the lifting element 14 to still rotate, provide a lower torque than the combined torque of the motors 30-2 and 30-3. This mode of operation may be altered, when the lifting element 14 passes vertical (top point), such as by a predetermined margin. Now, the motor 30-1 actually provides a force in a direction preventing the lifting element 14 from rotating with the gravity. Then, also the motor 30-2 may be co-operating with the motor 30-1 to counteract the weight of the lifting element 14, where the motor 30-3 now provides a counter-acting torque preventing the lifting element 14 from moving toward or beyond vertical again.

When the lifting element 14 has a sufficiently large angle to vertical (from the top point), all motors may again move in synchronism in a direction preventing the lifting element 14 from moving with gravity. Alternatively, one or more motors may always exert a torque counter-acting the rotation of the lifting element 14.

Clearly, two motors may also perform this operation, as may even more motors if desired.

In this situation, what controls the change over between the situation where all motors co-operate and the situation where one or more motors work against the other(s) may be the angle of the lifting element 14 vis-à-vis vertical (top point).

As mentioned, often, other elements provide a torque on the lifting element 14, such as when the load 50 is supported by the lifting element 14 and is pulled upwardly by a winch 52 not supported by the lifting element 14 but present on e.g. a vessel or vehicle supporting the lifting element 14. In this situation, the size of the load and the angles (of the cable 54) between the lifting element 14 and, on one side, the load and, on the other side, the winch, will also affect the overall torque on the lifting element 14. In this situation, the problematic angle or position (top point) of the lifting element 14 may be far away from vertical.

In addition, when the lifting device is used on a vessel (or a vehicle positioned on a non-horizontal surface), the angle between the vessel and the lifting element 14 may not be an optimal parameter for the controlling, when the vessel/vehicle is not horizontal, such as due to waves.

In one situation, the torque applied by the motors may be used. In another situation, the torque on the drive rod or the axes/bearings may be used if desired.

Often, the torque provided by a motor may be read-out and used (together with the direction of the torque around the axis). In this connection, the change-over may take place when the combined torque of all motors (driving in the same direction) falls below a predetermined limit.

The torque applied by a motor may be sensed using a sensor or may be estimated from the power consumption of the motor.

Clearly, the counter-action of one (or more) motor(s) should be taken into account, as the resulting torque from the motors on the lifting element is the difference between the torque provided in one direction subtracted the torque provided in the other direction.

In FIG. 3, a further embodiment is illustrated. When lifting a load on a lifting element 14 which is rotatable, the rotation of the lifting element 14 clearly will shift the centre of gravity of the load 50. In the drawing, a picking-up position is seen at 14-1. This will cause the load 50 to swing which is not desired, especially if the load is to be set down on a surface.

This is aggravated, if additional movement is experienced, such as if the assembly is provided on a vessel or if wind is present.

A swinging of the load 50 is illustrated by the vertical arrows extending from the load.

This swinging may be halted by rotating the lifting element 14 (vertical arrows extending from the lifting element), so that the point of engagement 14-3 of the load, which is often a wire or chain block, may be positioned directly over the load 50, such as when at standstill in relation to the lifting element, the point 14-3, the first axis or the like, such as at an extreme of a swinging movement. Alternatively, the movement of the load may be tracked or predicted and the lifting element 14 moved in accordance to remain above the load or to break the movement of the load.

It is noted that this movement of the lifting element 14 is possible over the full angle range of the lifting element 14 but is easiest when the lifting element 14 is around vertical and/or where rotation of a predetermined angle requires the least torque. When rotation requires the least torque, the movement may be made swifter, so that any swinging may swiftly be stopped.

It is noted, as indicated above, that the lifting element 14 preferably Is an A frame, such as a LARS, which has two lifting elements 14 rotated around the same axis. Both lifting elements 14 may be rotated by a single drive or two drives. The top beam may have one or more wire or chain blocks and the like for directing wires and chains for moving loads.

The invention claimed is:

1. A lifting device for a vessel or vehicle, the lifting device comprising:

a lifting element tiltable around a predetermined first axis, a drive arrangement for tilting the lifting element, the drive arrangement comprising:

a drive rod connected to the lifting element, a rotatable element rotated by one or more electrical motors around a second axis, the drive rod being connected to the rotatable element so as to rotate around a third axis not identical to the second axis, the rotatable element being rotatable around the second axis between a first position where the distance between the second axis and a fourth axis is a minimum distance and a second position where the distance between the second axis and the fourth axis is a maximum distance, the motor (s) being configured to rotate more than 360° to bring the rotatable element from the first position to the second position, wherein, during a 360 degree rotation of the rotatable element around the second axis, the distance between the second axis and the fourth axis varies between a minimum distance and a maximum distance.

2. The lifting device according to claim 1, wherein the first, second and third axes are at least substantially parallel.

3. The lifting device according to claim 1, wherein the drive rod is connected rotatably to the lifting element around a fourth axis not identical to any of the other axes.

4. The lifting device according to claim 1, wherein the drive rod is connected to the lifting element at a predetermined distance from the first axis.

5. The lifting device according to claim 1, wherein the electrical motor (s) rotate(s) the rotatable element driving the drive rod, the drive rod rotating the lifting element around the first axis.

6. The lifting device according to claim 5, wherein, at a first rotational angle of the rotatable element, the lifting element is at a first extreme angle and, at a second rotational angle of the rotatable element, the lifting element is in a second, opposite, extreme angle and, for rotational angles between the first and second rotational angles of the rotatable element, the lifting element is at an angle between the first and second extreme angles.

* * * * *